United States Patent
Kantor et al.

(10) Patent No.: US 10,157,337 B1
(45) Date of Patent: Dec. 18, 2018

(54) PRE-NOTIFICATION WITH RFID DOCK DOOR PORTALS

(71) Applicant: Amazon Technologies, Inc., Seattle, WA (US)

(72) Inventors: Oleg Kantor, Kirkland, WA (US); David Bruce McCalib, Jr., Seattle, WA (US); Tak Keung Joseph Lui, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/625,865

(22) Filed: Jun. 16, 2017

(51) Int. Cl.
| | |
|---|---|
| *G06K 17/00* | (2006.01) |
| *G06K 19/07* | (2006.01) |
| *G06F 17/30* | (2006.01) |
| *G08B 13/14* | (2006.01) |
| *G08B 13/24* | (2006.01) |
| *G06Q 10/08* | (2012.01) |

(52) U.S. Cl.
CPC ... *G06K 17/0022* (2013.01); *G06F 17/30952* (2013.01); *G06K 19/0728* (2013.01); *G06Q 10/0833* (2013.01); *G08B 13/14* (2013.01); *G08B 13/2402* (2013.01); *G08B 13/246* (2013.01)

(58) Field of Classification Search
CPC ......... G06K 17/0022; G06K 17/30952; G06K 19/0728; G08B 13/14; G08B 13/246; G08B 13/2402
See application file for complete search history.

(56) References Cited

U.S. PATENT DOCUMENTS

| | | | | |
|---|---|---|---|---|
| 6,456,239 | B1* | 9/2002 | Werb | G01S 5/02 235/385 |
| 6,496,806 | B1* | 12/2002 | Horwitz | G06K 17/0029 340/10.1 |
| 7,028,638 | B2* | 4/2006 | Bonsall | B60P 3/04 119/400 |

(Continued)

FOREIGN PATENT DOCUMENTS

GB    2429559 A    2/2007

OTHER PUBLICATIONS

Erick C. Jones, et al., "RFID in Logistics: A Practical Introduction", Dec. 31, 2007, pp. 19-35, 325-328. (abstract only).

(Continued)

*Primary Examiner* — Daniel Walsh
(74) *Attorney, Agent, or Firm* — Patterson + Sheridan, LLP

(57) ABSTRACT

Embodiments presented herein describe an RFID system for detecting RFID tags in order to track inventory such as a pallet or individual packages. The RFID system includes at least one portal located in an inventory transport area. For example, the portal may be disposed at or near a dock door in a warehouse in order to detect when an RFID tag (and the corresponding inventory) passes through the door—e.g., when the inventory is loaded onto a truck. In one embodiment, the portal defines at least two RFID detection regions. For example, the portal may generate a RFID sensing region and a RFID read region. In one embodiment, a wide beam antenna generates the RFID sensing region while a narrow beam antenna generates the RFID read region.

15 Claims, 7 Drawing Sheets

(56) References Cited

U.S. PATENT DOCUMENTS

| | | | |
|---|---|---|---|
| 7,973,641 B1* | 7/2011 | Huang | B60R 25/00 340/10.1 |
| 8,803,706 B2 | 8/2014 | Morin | |
| 9,519,811 B1* | 12/2016 | Simon | G06K 7/10356 |
| 2001/0040512 A1* | 11/2001 | Hines | G07C 9/00111 340/8.1 |
| 2002/0089434 A1* | 7/2002 | Ghazarian | G06Q 10/08 340/988 |
| 2002/0104013 A1* | 8/2002 | Ghazarian | G01S 17/74 726/27 |
| 2002/0130778 A1* | 9/2002 | Nicholson | B65D 5/4233 340/572.1 |
| 2003/0071717 A1* | 4/2003 | Hagl | B60R 25/24 340/5.61 |
| 2003/0093305 A1* | 5/2003 | Davis | G06Q 10/02 705/5 |
| 2003/0216969 A1 | 11/2003 | Bauer et al. | |
| 2003/0227382 A1* | 12/2003 | Breed | G06Q 20/203 340/539.13 |
| 2005/0040950 A1* | 2/2005 | Clucas | G08B 13/2417 340/572.1 |
| 2005/0246248 A1 | 11/2005 | Vesuna | |
| 2006/0033623 A1* | 2/2006 | Hines | G08B 21/0227 340/572.1 |
| 2006/0038077 A1* | 2/2006 | Olin | B64D 9/00 244/137.1 |
| 2006/0097874 A1* | 5/2006 | Salesky | G08B 13/2417 340/572.1 |
| 2006/0187042 A1* | 8/2006 | Romer | G06Q 20/208 340/572.1 |
| 2007/0001854 A1* | 1/2007 | Chung | G08B 13/02 340/572.1 |
| 2008/0061936 A1* | 3/2008 | Park | G06K 7/0008 340/10.1 |
| 2008/0068273 A1* | 3/2008 | Schneider | G08B 13/2474 343/742 |
| 2008/0094212 A1* | 4/2008 | Breed | G08B 13/1663 340/541 |
| 2008/0185540 A1* | 8/2008 | Turner | G01D 21/00 250/515.1 |
| 2009/0009295 A1* | 1/2009 | Rofougaran | H04B 5/0012 340/10.1 |
| 2009/0145967 A1* | 6/2009 | Carpenter | B07C 3/00 235/385 |
| 2009/0160638 A1* | 6/2009 | Jesme | G01S 13/825 340/539.11 |
| 2010/0176922 A1* | 7/2010 | Schwab | G06K 7/10356 340/10.1 |
| 2010/0218424 A1* | 9/2010 | Maher | B41M 5/0047 49/70 |
| 2010/0277322 A1* | 11/2010 | Eckert | G08B 13/2434 340/572.3 |
| 2010/0295687 A1* | 11/2010 | Kuzniar | G06Q 10/08 340/573.3 |
| 2011/0012713 A1* | 1/2011 | Wilkinson | G06K 7/10178 340/10.3 |
| 2011/0050400 A1* | 3/2011 | Ho | G06K 7/0008 340/10.42 |
| 2011/0074582 A1* | 3/2011 | Alexis | G08B 13/149 340/572.1 |
| 2011/0140977 A1* | 6/2011 | Yang | H01Q 1/2216 343/725 |
| 2012/0044074 A1* | 2/2012 | Mulla | G06Q 10/08 340/572.1 |
| 2012/0212343 A1* | 8/2012 | Grunenberg | G06K 7/10009 340/572.3 |
| 2012/0307051 A1* | 12/2012 | Welter | G08B 13/248 348/143 |
| 2012/0326862 A1* | 12/2012 | Kwak | G06Q 10/0833 340/539.12 |
| 2013/0141241 A1* | 6/2013 | Chen | G06K 7/10316 340/572.1 |
| 2013/0169466 A1* | 7/2013 | Frederick | G08B 13/248 342/22 |
| 2013/0278382 A1* | 10/2013 | Cristache | G07C 9/00111 340/5.65 |
| 2013/0314210 A1* | 11/2013 | Schoner | G06K 7/10366 340/8.1 |
| 2014/0197926 A1* | 7/2014 | Nikitin | G06K 7/10009 340/10.1 |
| 2016/0351035 A1* | 12/2016 | Wong | G08B 13/2434 |
| 2017/0316537 A1* | 11/2017 | Drzymala | G06Q 90/20 |

OTHER PUBLICATIONS

Nemai Chandra Karmakar, "Handbook of Smart Antennas for RFID Systems", first published Sep. 7, 2010, pg. 386. (abstract only).
International Search Report for PCT/US2018/030418, dated Jul. 20, 2018.

* cited by examiner

PRE-NOTIFICATION WITH RFID DOCK DOOR PORTALS

BACKGROUND

Shipping warehouses can use radio frequency identification (RFID) systems to track inventory. RFID tags, which can be passive or active, are disposed on the inventory (e.g., individual boxes or pallets) in the warehouse and are programmed with information identifying the associated inventory. The identifying information is read from the RFID tags by RFID readers. In one example, the RFID readers are located at loading docks or loading bays so that an inventory tracking system can detect when RFID tags (and the corresponding inventory) pass through a dock door when being loaded into, or offloaded from, a truck. In this manner, the inventory tracking system can determine what inventory is in the warehouse.

In one example, the inventory tracking system uses the RFID system to ensure the inventory passes through the correct loading dock, and thus, is loaded onto the correct truck. That is, the inventory tracking system assigns an RFID tag (or tags) to a particular dock door and uses the RFID readers to ensure the RFID tag (and the corresponding inventory) pass through the correct dock door. If, however, the inventory tracking system determines that an RFID tag passes through an incorrect dock door, the tracking system can alert a warehouse worker who can remove the inventory from the truck and transport the inventory to the correct loading dock. However, current RFID systems can take several seconds to alert the warehouse worker or the truck driver that an RFID tag has passed through an incorrect dock door. By that time, the worker may have already dropped off the inventory in the truck and returned to the warehouse. After receiving the alert, the worker has to return to the truck and find the inventory. Providing alerts earlier can reduce the time required to correct mistakes when loading inventory.

BRIEF DESCRIPTION OF DRAWINGS

Various embodiments in accordance with the present disclosure will be described with reference to the drawings, where like designations denote like elements.

DETAILED DESCRIPTION

Embodiments presented herein describe an RFID system for detecting RFID tags in order to track inventory such as a pallet or individual packages. The RFID system includes at least one portal located in an inventory transport area. For example, the portal may be disposed at or near a dock door in a warehouse in order to detect when an RFID tag (and the corresponding inventory) passes through the door—e.g., when the inventory is loaded onto a truck. In one embodiment, the portal defines at least two RFID detection regions. For example, the portal may generate a RFID sensing region and a RFID read region. In one embodiment, a wide beam antenna generates the RFID sensing region while a narrow beam antenna generates the RFID read region.

The antennas can be arranged in the portal such that the RFID sensing region (i.e., the radiation pattern of the wide beam antenna) covers a region of the loading dock that extends further away from the dock door and the portal than the RFID read region (i.e., the radiation pattern of the narrow beam antenna). As such, in one embodiment, the RFID system uses the RFID sensing region as an early detection sensing region to detect when an RFID tag is in the loading dock and is approaching the dock door. The RFID system can use the narrower RFID read region to determine when the RFID tag has passed by the portal and through the dock door and is being loaded into the truck. In this way, the RFID sensing region provides preliminary feedback regarding whether the RFID tagged inventory is at the correct loading dock, and can also activate the RFID read region in anticipation of the inventory entering the RFID read region. Such a multi-regional sensing portal allows earlier activation of the RFID read region than is possible using sensing means such as a laser sensor provisioned in the RFID read region or other conventional means.

Figure 1:
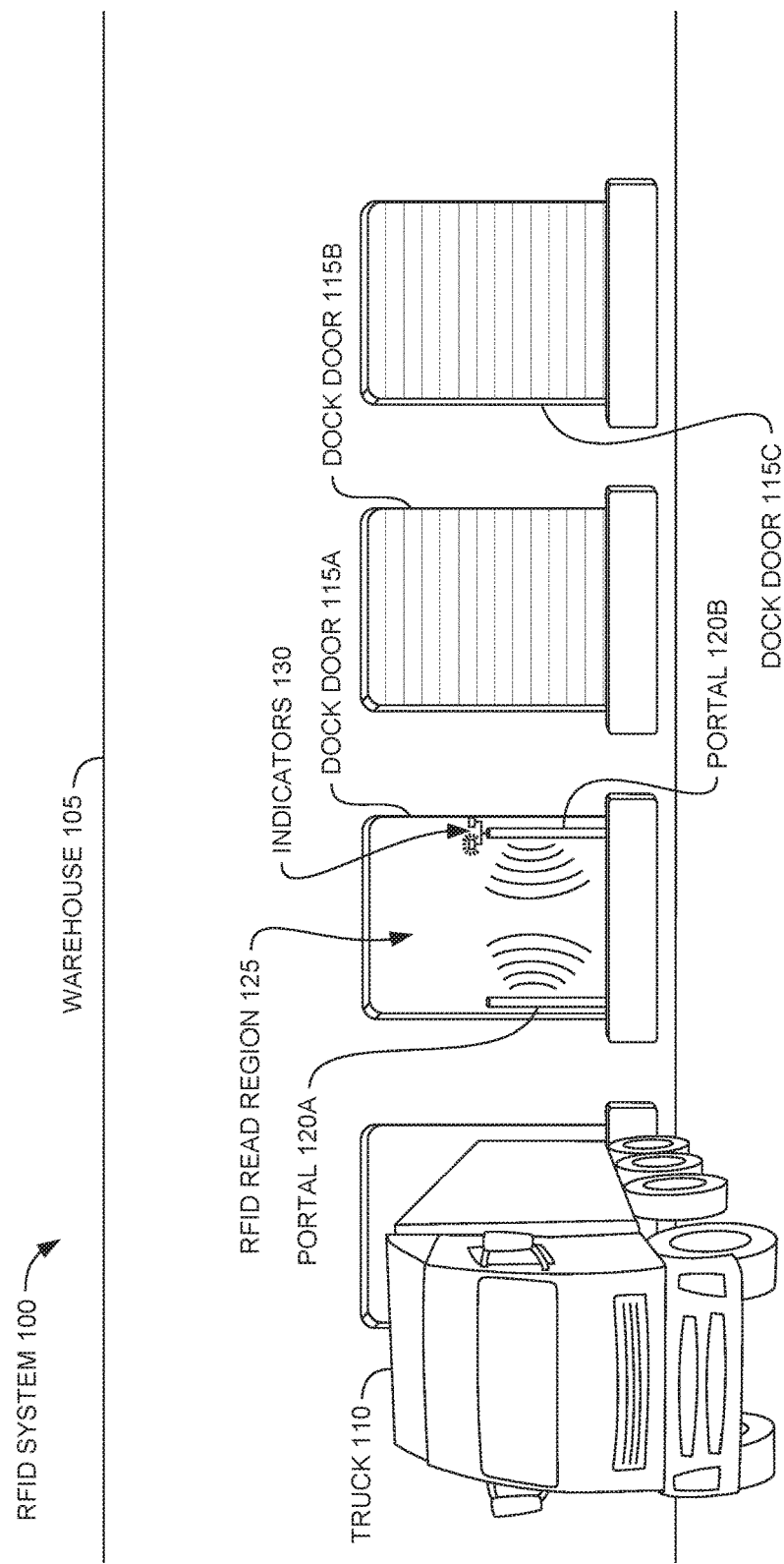
FIG. 1 illustrates an RFID system for tracking RFID tags in a warehouse, according to various embodiments.

FIG. 1 illustrates an RFID system 100 for tracking RFID tags in a warehouse 105, according to various embodiments. As shown, the warehouse 105 includes multiple dock doors 115 which permit a warehouse worker (or an autonomous vehicle) to load inventory into, or retrieve inventory from, a truck 110. In FIG. 1, the dock door 115A is open while the dock doors 115B and 115C are closed. As such, the dock door 115A provides a view into the warehouse 105 and a loading dock. In this embodiment, the loading dock includes two portals 120A-B (generally referred to herein as portals 120) which are disposed at or near opposite sides of the dock door 115A. The portals 120 can be disposed in any manner to ensure that inventory passing through the dock door 115A also pass between the portals 120.

In FIG. 1, each of the portals 120 include at least one RFID reader and antenna (not shown) which establish a RFID read region 125. That is, the respective radiation patterns of the antennas in the portals can be combined to form the RFID read region 125. When an RFID tag moves within the RFID read region 125, the tag detects the radio waves emitted by the antennas in the portals 120 and transmits a modulated RFID response that includes identification (ID) data corresponding to the tag. In one embodiment, each RFID tag is assigned a unique ID which the RFID system 100 uses to track to the tags. This allows inventory to be tracked at the individual unit level. In other embodiments, inventory is tracked at the type or category level. For example, the RFID tags may be given IDs which are generic to a specific type or category of inventory—e.g., all RFID tags attached to packages containing hair dryers have a first shared ID while all RFID tags attached to packages containing curling irons have a second shared ID which is different than the first shared ID.

The RFID readers in the portals 120 receive the modulated RFID responses from the tags and demodulate the data in the responses to identify the ID for the tag. The portal can report the tag ID to an inventory tracking system which determines whether the RFID tag is assigned to the dock door 115A. In one embodiment, the inventory tracking system includes a tag database which assigns the RFID tags to a particular dock door 115 which each can have a corresponding RFID scanning system that includes at least one portal 120. For example, a fulfillment system may populate the entries in the tag database in response to a customer placing an order for inventory stored in the warehouse 105. The fulfillment system can select inventory in the warehouse 105 to satisfy the customer order, identify the RFID tag (or tags) corresponding to the selected inventory, and assign the RFID tag to a particular dock door 115 using the tag database so that the inventory is loaded into a truck which is assigned to the geographic region of the customer.

A warehouse worker can receive instructions from the fulfillment system to retrieve the inventory and load the inventory into a truck at the corresponding dock door. However, multiple errors can result in the wrong inventory being loaded into the truck. For example, the wrong RFID tag could have been placed on the inventory, the worker may retrieve the wrong inventory, or the worker may move the inventory to the wrong dock door. Using the portals 120 and the associated RFID read region 125, the inventory tracking system can detect when a mistake has been made and use indicators 130 to inform the warehouse worker that there is a problem.

In FIG. 1, the indicators 130 are lights mounted on the top of the portal 120B. For example, the indicators 130 may include a red light for indicating when there is in an error and a green light for indicating that the RFID tag is at the correct dock door. However, the indicators 130 can include any number of lights for indicating any number of different of scenarios—e.g., a third light indicating when the RFID reader cannot accurately determine the ID for the RFID tag. In other embodiments, the indicators 130 can be mounted on both portals 130 or outside of the warehouse 105 (such that they are viewable to the truck driver). Moreover, the indicators 130 can output audio alerts in addition to (or as an alternative to) visual alerts. In another embodiment, the inventory tracking system can send alerts electronically to a mobile phone or tablet carried by the warehouse worker or a quality control specialist, or directly to an autonomous vehicle moving the inventory.

If the RFID tag read by the portal 120 is intended to be delivered to the dock door 115A, the inventory tracking system may illuminate a green light of the indicators 130 indicating to the worker to proceed with loading the inventory into the truck. However, if the RFID tag is not intended for the dock door 115A, the inventory tracking system illuminates a red light indicating to the worker there is an error.

If an error is detected, the worker may move the inventory from the loading dock to a staging area or a designated location. A quality control specialist may be tasked with identifying the correct dock door 115 for the inventory. For example, the specialist may use a predefined workflow process to troubleshoot the problem and identify the solution, such as placing the correct RFID tag on the inventory, restocking the incorrect inventory and retrieving the correct inventory, or moving the inventory to the appropriate loading dock.

Figure 2:
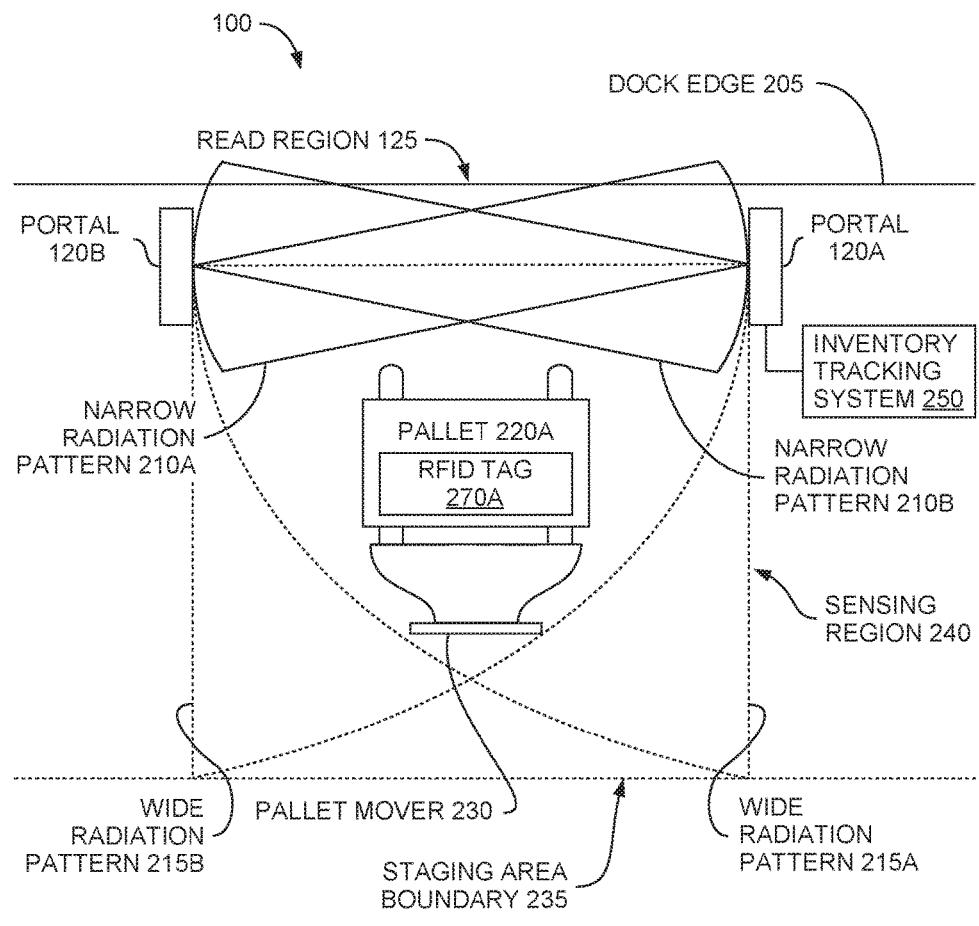
FIG. 2 illustrates a top view of RFID read and sensing regions generated by the portals, according to various embodiments.

FIG. 2 illustrates a top view of the RFID read and sensing regions generated by the portals, according to various embodiments. This top view includes a dock edge 205 which illustrates where a truck can back up to in order to load and unload inventory from the warehouse and a staging area boundary 235 where pallets 220 can be stored when waiting to be loaded into the truck. The area between the dock edge 205 and the staging area boundary 235, and between the portal 120A and the portal 120B is referred to herein as the loading dock or loading bay.

Each of the portals 120 include a narrow beam antenna for generating a respective narrow radiation pattern 210 (shown using solid lines) and a wide beam antenna for generating a respective wide radiation pattern 215 (shown using dotted lines). That is, the narrow beam antenna in the portal 120A emits the narrow radiation pattern 210A while the wide beam antenna in the portal 120A emits the wide radiation pattern 215A. Similarly, the narrow beam antenna in the portal 120B emits the narrow radiation pattern 210B while the wide beam antenna in the portal 120B emits the wide radiation pattern 215B. The combined area covered by the narrow radiation patterns 210A and 210B is defined as the read region 125 while the combined area covered by the wide radiation patterns 215A and 210B is defined as the sensing region 240.

In this embodiment, the read region 125 extends primarily between the portal 120A and 120B. However, the portals 120 can control the size and direction of the narrow radiation patterns 210 to adjust the location and size of the read region 125 as desired. For example, by controlling the beam width of the narrow beam antennas, the emission power of the antennas, and the facing direction of the antennas, the portals 120 can change the size and location of the read region 125. In FIG. 2, the narrow radiation patterns 210 are set so that read region 125 primarily includes the area directly in front of the dock edge and between the portals 120. A system designer can control the narrow radiation patterns 210 to limit the read region 125 from extending in the area between the portals 120 and the staging area boundary 235 (although it may extend into this region some as shown in FIG. 2). As a result, if only the read region 125 is active (i.e., the wide beam antennas are turned off), the RFID tag 270A on pallet 220A would not be detected by the RFID readers in the portals 120. That is, because the RFID tag 270A is not in the read region 125, the tag 270A is not detected by the portals 120 (although changes in the physical environment in the warehouse may cause the read region 125 to change such that the RFID tag 270A is occasionally detected by the RFID readers in the portals 120 albeit with a low signal strength).

The wide radiation patterns 215 in FIG. 2 are set such that the sensing region 240 generally covers the area of the loading dock that is between the portals 120 and the staging area boundary 235. As such, when the wide beam antennas are active, the RFID readers in the portals 120 can detect when an RFID tag passes over the staging area boundary 235 into the loading dock and begins to move towards the dock edge 205. Thus, the portals 120 report the tag 270A (and the pallet 220A) as being located within the sensing region 240 to the inventory tracking system 250 which is communicatively coupled to one or both of the portals 120. Put differently, the portals 120 can inform the inventory tracking system 250 that the pallet 220A has moved into the loading dock.

Although FIG. 2 illustrates that the wide radiation patterns 215 and the sensing region 240 are contained within the loading dock—i.e., does not extend into the staging area or to the left of the portal 120B or the right of the portal 120A—this is an idealized illustration. In practice, the sensing region 240 may extend into the staging area or into neighboring loading docks. Moreover, the sensing region 240 may change as the physical objects in the environment move around which can result in tags 270 that were once outside of the sensing region 240 to be detected. However, as described below, the portals 120 can account for the dynamic nature of the read region 125 and the sensing region 240 by using power thresholds and monitoring the signals received from the RFID tags 270 over time. For example, the tags 270B, 270C, and 270D on the pallets 220B, 220C, and 220D in the staging area may occasionally be detected by the RFID reader but the portal 120 may ignore their signals because the signals are below an RSSI threshold.

In FIG. 2, a pallet mover 330 moves the pallet 220A from the staging area into the loading dock. Eventually, the pallet mover 330 moves the pallet 220A over the dock edge 205 and into the truck. As described below, the portals 120 use the read region 125 and the sensing region 240 to ensure that the pallet 220A is within the loading dock and that the loading dock is assigned to the RFID tag 270A. If not, the portals 120 can use indicators to alert a worker that the pallet 220A should not be loaded onto the truck.

Although FIG. 2 illustrates using two portals 120, in one embodiment, the RFID system 100 can include only one portal 120 per loading dock (e.g., one portal disposed at each dock door). However, having two portals 120 (or more than two portals 120) can increase the accuracy of the RFID system 100 and enable better control of the sizes and locations of the read and sensing regions 125 and 240. Moreover, instead of using separate antennas to generate the narrow radiation pattern 210 and the wide radiation pattern 215, the portals 120 can use one antenna to generate the two radiation patterns, according to other embodiments. For example, the portal 120 can control a power setting of the antenna and use beam forming to generate the two different size radiation patterns shown in FIG. 2 with one stationary antenna. In another embodiment, the portal 120 can include one or more actuators to change the orientation of the antenna (as well as adjust the gain of the antenna) to generate the narrow and wide radiation patterns 210 and 215.

In one non-limiting example, the portals 120 are spaced 10 feet apart (+/−2 feet) and are spaced within two feet from the dock edge 205 (or from an external wall of the warehouse). Further, dock edge 205 may be 13.5 feet (+/−2 feet) from the staging area boundary 235. The widths (W) of the read region 125 and the sensing region 240 (i.e., the direction between the portals 120) is approximately 10 feet. The length (L) of the read region 125 at its longest point may be approximately 6.5 feet. The length of the sensing region 240 at its longest point may be approximately 11 feet.

Figure 3:
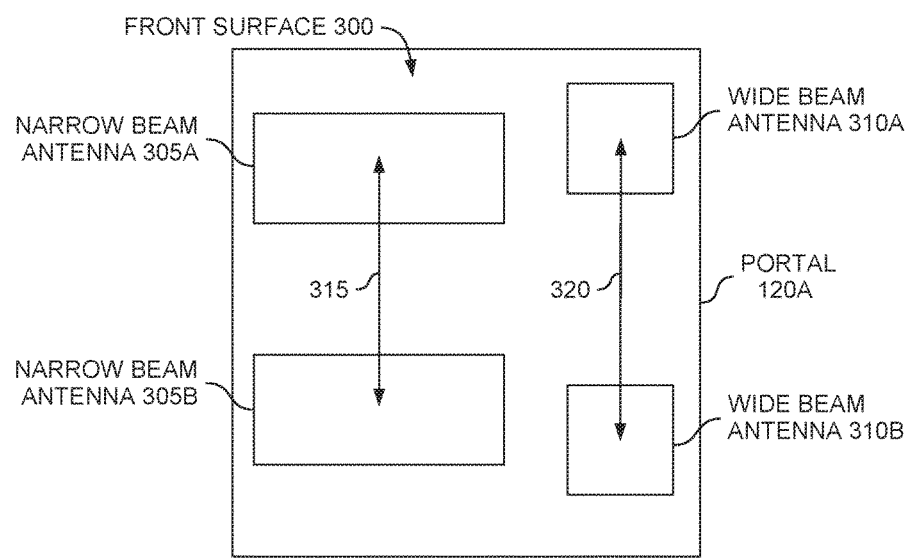
FIG. 3 illustrates a front surface of a portal, according to various embodiments.

FIG. 3 illustrates a front surface 300 of the portal 120A, according to various embodiments. Referring to FIG. 2, in one embodiment, the front surface 300 is the side of the portal 120A that is facing the portal 120B. In this example, the front surface 300 includes two narrow beam antennas 305 and two wide beam antennas 310. As mentioned above, in other embodiments, the portal 120A can include only one narrow beam antenna 305 and only one wide beam antenna 310. Further, the portal 120A can include three, four, or more of the narrow and wide beam antennas 305 and 310.

The optimal distance between the pairs of antennas can vary depending on the specific antennas used. For example, a center-to-center distance 315 between the narrow beam antennas 305 and a center-to-center distance 320 between the wide beam antennas 310 can change depending on the beam width or aperture of the antennas. As the beam width or aperture narrows, the distances 315 and 320 may be reduced. Conversely, if the beam width or aperture of the antennas widens, the distances 315 and 320 are spaced farther apart. In one embodiment, the beam widths of the narrow and wide beam antennas 305 and 310 and the distances 315 and 320 can be set such that the RFID tags can be detected with an accuracy of greater than 99% when in the read region.

In one embodiment, the portal 120A has a width in the horizontal direction of approximately 20 inches, a height in the vertical direction of approximately 6 feet, and a depth in a direction into the page of approximately 10 inches.

In one embodiment, the antennas in the front surface of the portal 120B can have the same arrangement as the front surface 300 shown here. That is, the center-to-center distances for the pairs of antennas can be the same in both portals 120.

Figure 4A:
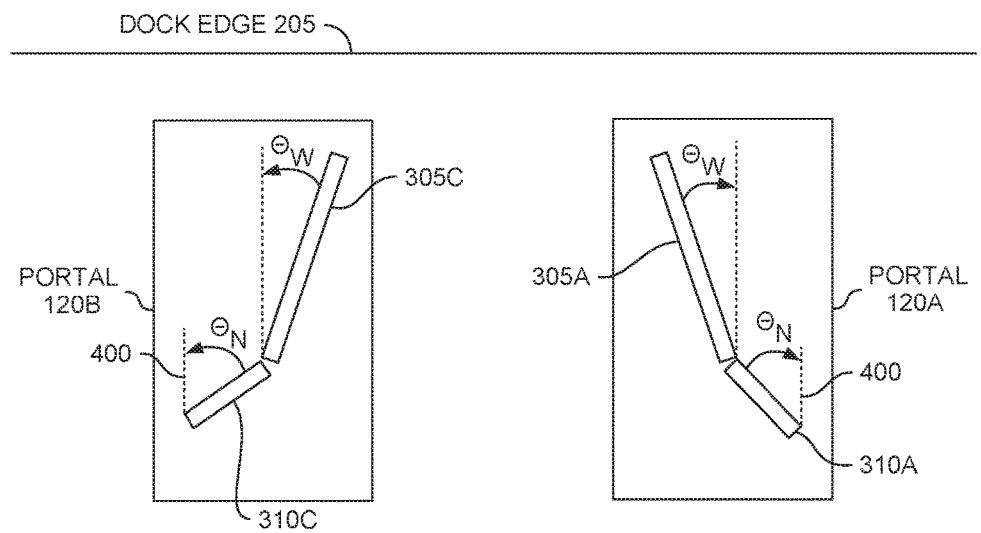
FIGS. 4A and 4B illustrate top views of the portals, according to various embodiments.
Figure 4B:
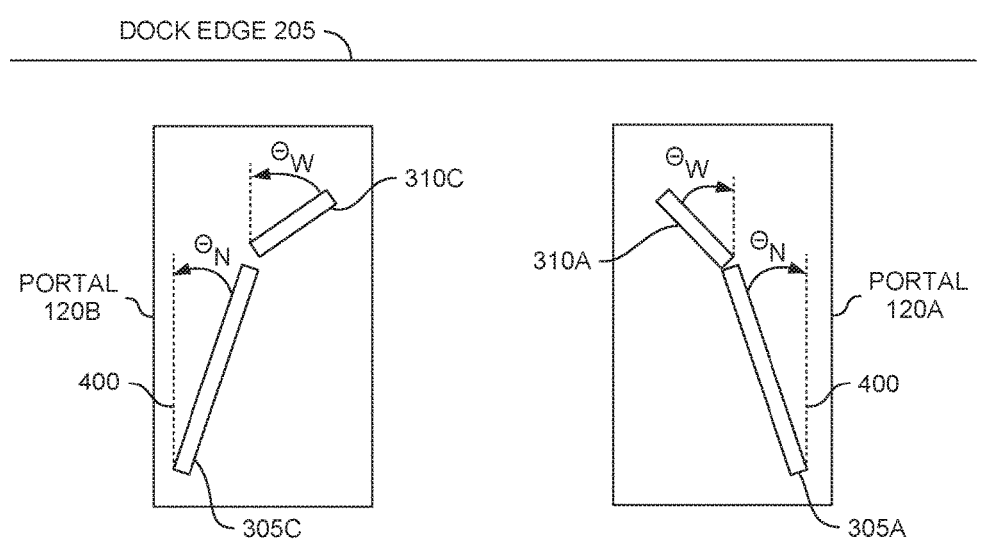

FIGS. 4A and 4B illustrate top views of the portals 120, according to various embodiments. In FIG. 4A, the narrow band antennas 305 and the wide band antennas 310 in each of the portals 120 are arranged at an angle relative to a reference axis 400 (shown by the vertical dotted lines) that is perpendicular to the dock edge 205. Specifically, the narrow beam antennas 305 are offset by an angle $\theta_N$ from the axis 400 while the wide beam antennas are offset an angle $\theta_W$ from the axis 400. In one embodiment, the offset angle $\theta_N$ ranges from 0 degrees to 20 degrees while the offset angle $\theta_W$ ranges from 35 degrees to 55 degrees. As mentioned above, the particular value of the angles $\theta_N$ and $\theta_W$ can vary depending on the desired size and location of the read and sensing regions generated by the portals 120.

Although FIG. 4A illustrates only one of the narrow and wide beam antennas 305 and 310 in each of the portals, the other narrow and wide beam antennas 305 and 310 in the portals 120 can have the same arrangement relative to the axis 400. For example, the narrow beam antenna 305B in the portal 120A can have the same offset angle $\theta_N$ relative to the axis 400, while the wide beam antenna 310B has the same offset angle $\theta_W$ relative to the axis 400.

In FIG. 4A, the narrow beam antennas 305 are disposed closer to the dock door 205 than the wide beam antennas 310. However, in FIG. 4B, the wide beam antennas 310 are disposed closer to the dock door 205. Although two arrangements of antennas are shown, the antennas 305 and 310 can be disposed in any manner to provide read and the sensing regions for identifying RFID tags as described herein.

Figure 5:
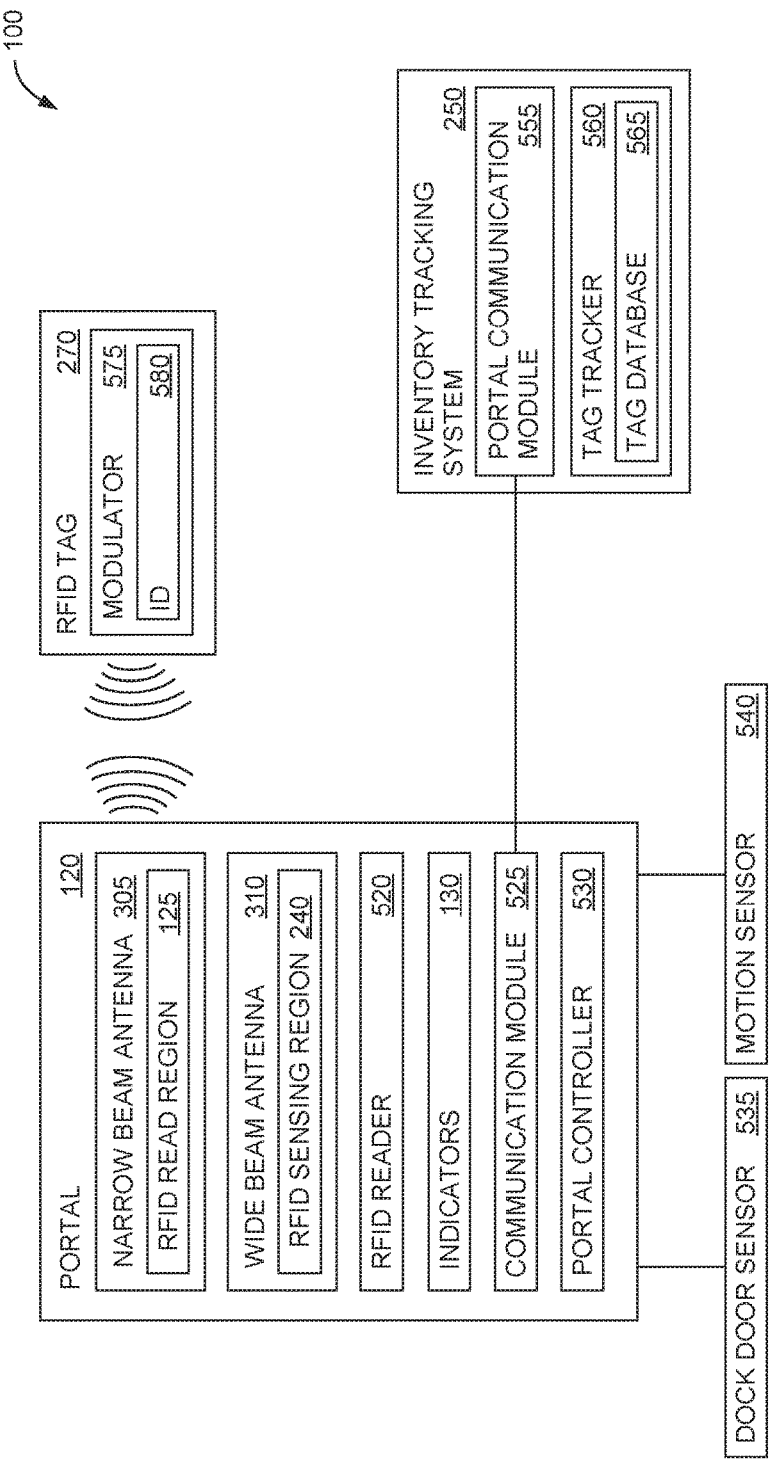
FIG. 5 is a block diagram of an RFID system which includes portals for tracking RFID tags, according to various embodiments.

FIG. 5 is a block diagram of the RFID system 100 which includes the portal 120 for tracking RFID tags 270, according to various embodiments. In addition to the portal 120 and the RFID tag 270, the RFID system 100 also includes the inventory tracking system 250, a dock door sensor 535, and a motion sensor 540 which are all communicatively coupled to the portal 120.

In the illustrative embodiment, the portal 120 includes a narrow beam antenna 305 a wide beam antenna 310, an RFID reader 520, the indicators 130, a communication module 525, and a portal controller 530. Although the portal 120 illustrates one narrow and wide beam antenna 310, the portal 120 may include multiple antennas. For example, using two, three, four, etc. of each of the antennas can improve spatial diversity and accuracy when detecting the RFID tags 270.

When energized, the narrow beam antenna 305 establishes the RFID read region 120 while the wide beam antenna 310 establishes a RFID sensing region 240. The different characteristics of the RFID read region 120 and the RFID sensing region 240 are illustrated in FIG. 2 which result from the different beams or apertures of the narrow and wide beam antennas 305 and 310 as well as the arrangement of the antennas 305 and 310 within the portal 120 as shown in FIGS. 3 and 4. In one embodiment, the RFID sensing region 240 is used as an early detection region for identifying the RFID tag 270 in the loading dock before the tag 270 has passed by the portal 120 or the through the dock door. For example, the RFID sensing region 240 can cover a region of the loading dock which extends away from the dock door and towards an internal portion of the warehouse (e.g., a staging area in the warehouse). The RFID read region 125, in contrast, may primarily include a region between two portals 120 flanking the dock door. In one embodiment, the sensing region 240 covers a larger area than the read region 125.

In addition to transmitting RFID signals to the RFID tag 270, the narrow beam antenna 305 and the wide beam antenna 310 receive RFID signals from the tag 270. The received RFID signals (or responses) are read by the RFID reader 520. In one embodiment, the RFID reader 520 includes a demodulator for identifying an ID 580 of the RFID tag 270. In this manner, the reader 520 can identify tags that enter into the RFID read region 125 and the RFID sensing region 240. Moreover, the RFID reader 520 can generate metrics regarding the received RFID responses such as the signal strength of the RFID signals (e.g., received signal strength indicator (RSSI)).

The communication module 525 communicatively couples the portal 120 to the inventory tracking system 250, the dock door sensor 535, and the motion sensor 540. In one embodiment, the communication module 525 is a network adapter that communicates with the inventory tracking system 250 using a local area network (LAN) or wide access network (WAN). Moreover, the communication module 525 can use wired or wireless means in order to communicate with external systems and devices.

The portal controller 530 may include one or more processors or processing elements that control the operation of the portal 120 as described herein. Moreover, the portal controller 530 can include firmware and/or software applications. In one embodiment, the portal controller 530 can receive the tag ID 580 and the signal strength corresponding to the ID 580 from the RFID reader 520 and determine a location of the tag 270 in one of the regions 125 and 240. In addition, the portal controller 530 can receive signals from the dock door sensor 535 and dock motion sensor 540 to determine whether the dock door is open or closed and whether a worker or vehicle is moving in the loading dock. The portal controller 530 can transmit information such as the location of the RFID tag 270 to the inventory tracking system 250 using the communication module 525.

The inventory tracking system 250 includes a portal communication module 555 and a tag tracker 560. The portal communication module 555 can be a network adapter for communicating with the portal 120 using a LAN or WAN. The tag tracker 560 uses the information about the location of the RFID tag 270 provided by the portal controller 530 to update a tag database 565. In one embodiment, the tag database 565 maps the ID 580 of the tag 270 to a particular location in the warehouse—e.g., whether the tag is in the RFID read region 125, the RFID sensing region 240, or on the truck. In some embodiments, the tag database 565 may also track the tag 270 at other locations in the warehouse such as in the staging area or on a shelf. In any case, the portal controller 530 can use the information provided by the RFID reader 520 to identify a location of the RFID tag 270 which is then communicated to the tag tracker 560 which updates the tag database 565. The tag tracker 560 can include hardware elements, software elements, or some combination of both.

The inventory tracking system 250 can be a computing system disposed in the warehouse or external to the warehouse. For example, the inventory tracking system 250 can be an application executing in a data center or a cloud computer environment which is communicatively coupled to the portal 120 via the Internet.

The RFID tag 270 can be a passive or active tag. If passive, the RFID tag 270 uses the RFID signals emitted by the narrow beam antenna 305 and the wide beam antenna 310 to power its internal components (e.g., the modulator 575) in order to transmit a RFID response back to the portal 120 which includes the ID 580 encoded therein. Put differently, a passive RFID tag 270 does not need an internal battery but is instead uses the incident RFID signals to transmit a response that includes its ID 580. An active RFID tag, in contrast, includes a power supply which can be used to operate its internal components such as a receiver or the modulator 575. Although passive RFID tags are typically less expensive, active RFID tags can be sensed at greater ranges. In one embodiment, the active RFID tags transmit their corresponding ID after receiving the RFID signals transmitted by the antennas in the portal 120. However, in another embodiment, the active RFID tags function as beacons where the tags constantly transmit their IDs. In this example, the antennas in the portal do not need to emit the RFID signals but can be used to sense the RFID signals emitted by the active RFID tag.

Figure 6:
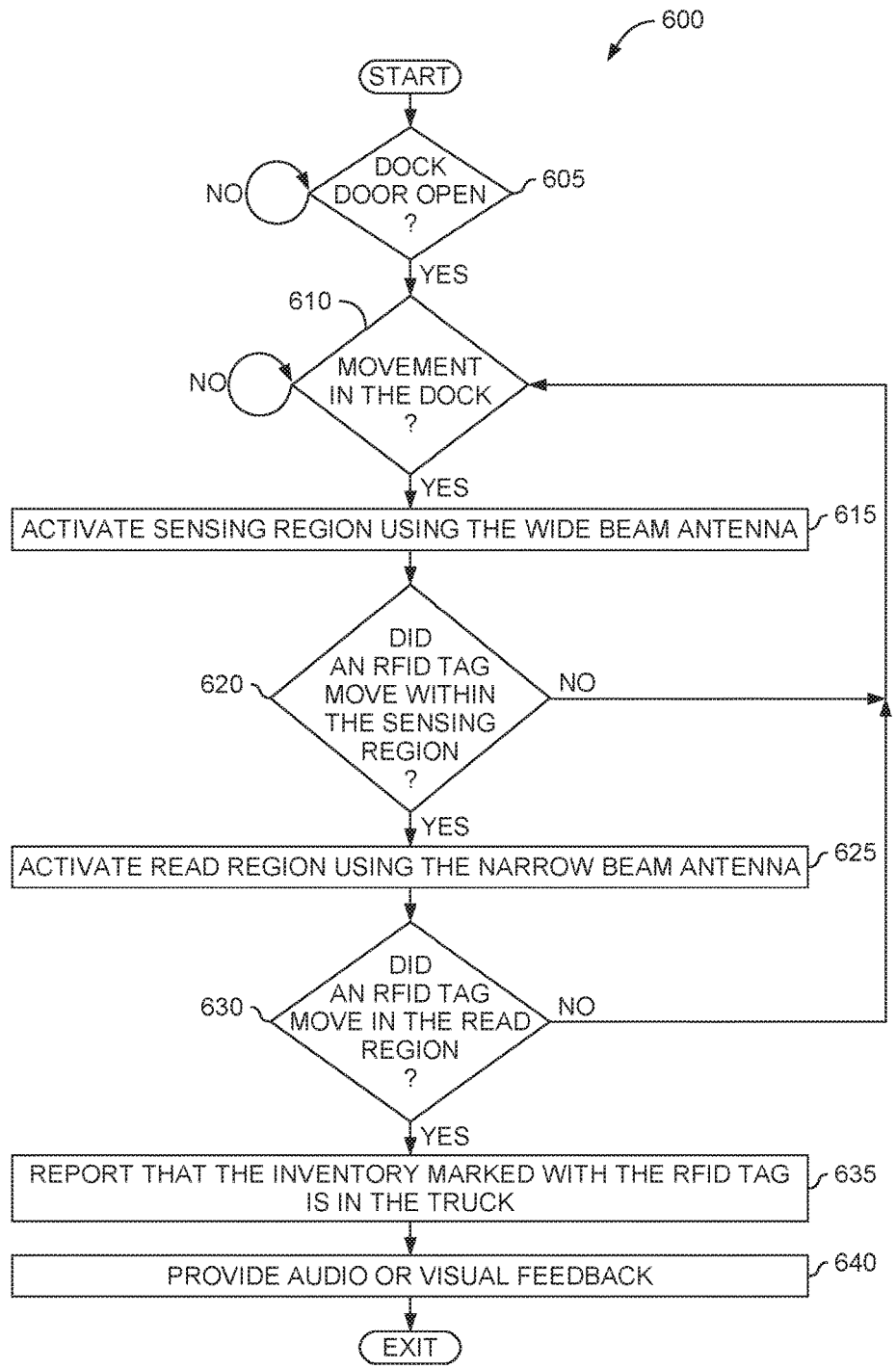
FIG. 6 is a flowchart for operating the portals, according to various embodiments.

FIG. 6 is a flowchart of a method 600 for operating portals at a loading dock, according to various embodiments. The method 600 begins at block 605 where the portal controller determines whether the dock door is open. In one embodiment, the portal controller is communicatively coupled to the dock door sensor which outputs a signal indicating whether the door is open or closed.

Once the dock door is opened, the method 600 proceeds to block 610 where the portal controller determines if there is movement in the loading dock. Here, the portal controller receives an input from the dock motion sensor which can be mounted above the dock door. In one embodiment, the dock motion sensor is a RF sensor that uses a frequency band that is outside of the frequency band (or bands) used by RFID sensing. For example, the dock motion sensor may use 24.150 GHz Doppler radar in order to determine if there is motion in the loading dock. Using the dock motion sensor, the portal controller can wait until a worker or an autonomous vehicle moves into the vicinity of the loading dock before activating the RFID read or sensing regions. Doing so may save power as well as prevent the portals from transmitting RFID signal when there is no movement in the loading dock which can interfere with sensing regions generated by portals in neighboring loading docks and cause false positives (e.g., indicate a pallet is moving when the pallet is in fact stationary).

In one embodiment, however, block 610 may be omitted from the method 600. For example, the RFID system may not include the motion sensor, and thus, method 600 may skip block 610 and proceed directly to block 615. At block 615, the portal controller activates the sensing region using the wide beam antenna in the portal. In one embodiment, the loading dock includes at least two portals, in which case the portal controller may activate the wide beam antennas on both of the portals in parallel such that their combined radiation patterns form the sensing region.

As shown in FIG. 2, the radiation patterns can be controlled such that the sensing region covers the area of the loading dock that is between the portals (which may be disposed at or near—e.g., within two feet from the dock edge) and the staging area. Although the dock motion sensor can inform the portal controller when there is movement in the loading dock, the sensing region can inform the portal controller whether the movement is attributable to inventory being moved from the staging area towards the dock edge. Put differently, because the sensing region is established by transmitting RFID signals, the RFID tags on the inventory can transmit their IDs to the portals which can be used to track the inventory. In this manner, the portal controller can identify what inventory is currently in the loading dock.

In one embodiment, the sensing region formed by the wide band antennas in the portal (or multiple portals) is an early detection sensing region that identifies inventory that is approaching the portals. As such, the sensing region may cover a path used by a pallet mover when loading inventory into a truck using the loading dock.

At block 620, the portal controller (or the inventory tracking system) determines whether an RFID tag moves into the sensing region. The details of block 620 are described in more detail in FIG. 7, but generally the portal controller can monitor the signal strength (e.g., RSSI) of the RFID response transmitted by the RFID tag when in the sensing region over time to determine whether the RFID tag is moving. For example, the physical environment in the warehouse can cause the signal strength of the RFID response to change even if the tag is sitting stationary. Thus, in one embodiment, the portal controller can monitor the signal strength over time and use thresholds to detect when the inventory is moving versus when the inventory is stationary.

If no RFID tags are moving, the method 600 returns to block 610 to wait for motion sensor to again detect motion in the loading dock. For example, the previously detected movement could have been caused by a worker walking between loading docks (without moving inventory). If the RFID system does not have a dock motion sensor, the method 600 could stay at block 620 where the portal controller continues to monitor RFID tags using the sensing region to determine if one of the tags changes locations. However, if the portal controller does determine at block 620 that the RFID tag moved into the sensing region, the method 600 proceeds to block 625 where the portal controller activates the read region using the narrow beam antennas.

In one embodiment, when activating the read region, the portal controller deactivates the sensing region. Put differently, the portal controller stops the wide band antennas from transmitting RFID signals when the narrow band antennas begin transmitting the RFID signals establishing the read region. Doing so may help the portal controller ensure that the RFID tag has moved from the sensing region into the read region. If the sensing region is deactivated, the portal controller can know that any received RFID responses from the tag were generated because the tag moved into the read region. Stated differently, the tag transmits RFID signals in response to the RFID signals emitted by the narrow beam antennas, and not in response to the RFID signals emitted by the wide beam antennas. However, even if the wide beam antennas are not used to transmit the RFID signals when the read region is active, the wide beam antennas can still be used to receive the RFID response from the tag. In another embodiment, however, the narrow and wide beam antennas can both be transmitting RFID signals (e.g., both the sensing region and the read region are active at the same time) and the portal controller can use the signal strength of the RFID response transmitted by the tag to determine if the tag is in the read region or is in the sensing region.

As illustrated in FIG. 2, the read region 125 can be generated to primarily cover the area between the portals 120. Because in one embodiment the read region 125 is activated after the RFID tag 270A is detected in the sensing region 240, the read region 125 can be activated before the tag 270A has moved into the read region 125—e.g., when the tag 270A is still only in the sensing region 240. Nonetheless, because the read region 125 is active, the portals 120 can detect the RFID tag 270A as soon as the tag 270A enters the read region 125. In comparison, in another embodiment, the portals 120 may include laser sensors that direct light between the portals 120. Instead of activating the read region 125 in response to detecting the tag 270A in the sensing region 240, the portals 120 wait until the pallet 220A breaks the beam of the laser sensors to activate the read region 125. However, at this point, the RFID tag 270A may have already entered the area covered by the read region 125, and thus, could have been detected sooner if the read region 125 was active. Thus, using the sensing region 240 to activate the read region 125 may reduce the time used by the portals 120 to provide feedback indicating to the warehouse worker whether the pallet 220A is assigned to the current loading dock.

In another embodiment, to increase the ability to provide the feedback sooner, the laser sensors could be disposed in the area between the portals 120 and the staging area boundary 235 (e.g., halfway between the portals 120 and the boundary 235). However, the laser sensors do not have the ability to determine whether the object that breaks its beam is inventory or a worker walking through the loading dock without moving inventory. Thus, the read region 125 could be activated when there is no RFID tagged inventory in the loading dock. Further, disposing the laser sensors in the loading dock (external to the portals) can be a hazard which can trip a warehouse worker or impede an autonomous mover from moving freely within the loading dock. Thus, one advantage of using the sensing region 240 is that the wide beam antennas can be disposed in the portals 120, which means RFID tagged inventory can be detected without placing additional structures in the loading dock.

At block 630, the portal controller determines whether the RFID tag moves into the read region. Like block 620, the details of block 630 are described in more detail in FIG. 7, but generally the portal controller can monitor the signal strength (e.g., RSSI) of the RFID response transmitted by the RFID tag over time to determine whether the RFID tag is moving in the read region. If the RFID tag is not moving through the read region (e.g., the tag is not currently passing through the read region to be loaded onto the truck), the method 600 returns to block 610 to wait for additional movement in the loading dock. If the RFID system does not have a dock motion sensor, the method 600 could instead return to block 615.

If movement within the read region is detected, the method 600 proceeds to block 635 where the portal controller reports to the inventory tracking system that the inventory marked with the RFID tag is in the read region and is about to be loaded into the truck. In response, the inventory tracking system can determine whether the RFID tag and the inventory have been assigned to that loading dock or truck. In one embodiment, the inventory tracking system includes the tag database 565 illustrated in FIG. 5 which assigns the RFID tags to a particular loading dock or truck. Once the portal controller determines the RFID tag is in the read region, the inventory tracking system can query the tag database to determine if the tag is assigned to that loading dock.

At block 640, the portal controller provides audio or visual feedback depending on whether the inventory tracking system determines if the RFID tag is assigned to the loading dock. If the tag is assigned to the loading dock, the portal controller can activate the appropriate indicator (e.g., a green light on the portal or an audio sound). If not, the portal controller can illuminate a red light or send an electronic message to a supervisor or the truck driver. In one embodiment, the portal controller may indicate that there is an error if the RFID tag detected using the sensing region at block 620 is not the same RFID tag detected using the read region at block 630. That is, if the same tag passing the read region was not detected in the sensing region, the portal controller may illuminate an amber light indicating that there was an error with the process performed by the RFID system and that the pallet should be removed from the loading dock and returned to the staging area where the worker can again move the pallet through the sensing and read regions.

In one embodiment, to further increase the responsiveness of the RFID system, the inventory tracking system queries the tag database after the tag is detected in the sensing region at block 620. That is, before the read region is activated, the portal controller can transmit the RFID tag ID identified in the sensing region to the inventory tracking system which determines if the tag is assigned to that portal by querying the tag database. Thus, once the tag is identified at block 630 (e.g., after the RFID system determines the inventory is being loaded onto the truck), the portal controller already knows whether the tag is intended for the truck and can provide the appropriate feedback as discussed above. In this embodiment, the portal controller does not need to wait for the inventory tracking system to query the tag database once the RFID tag is detected in the read region. Instead, the portal controller already knows whether the RFID tag is intended for the loading dock and can provide immediate feedback to the worker after ensuring the inventory is moving through the read region and is being loaded onto the truck.

Figure 7:
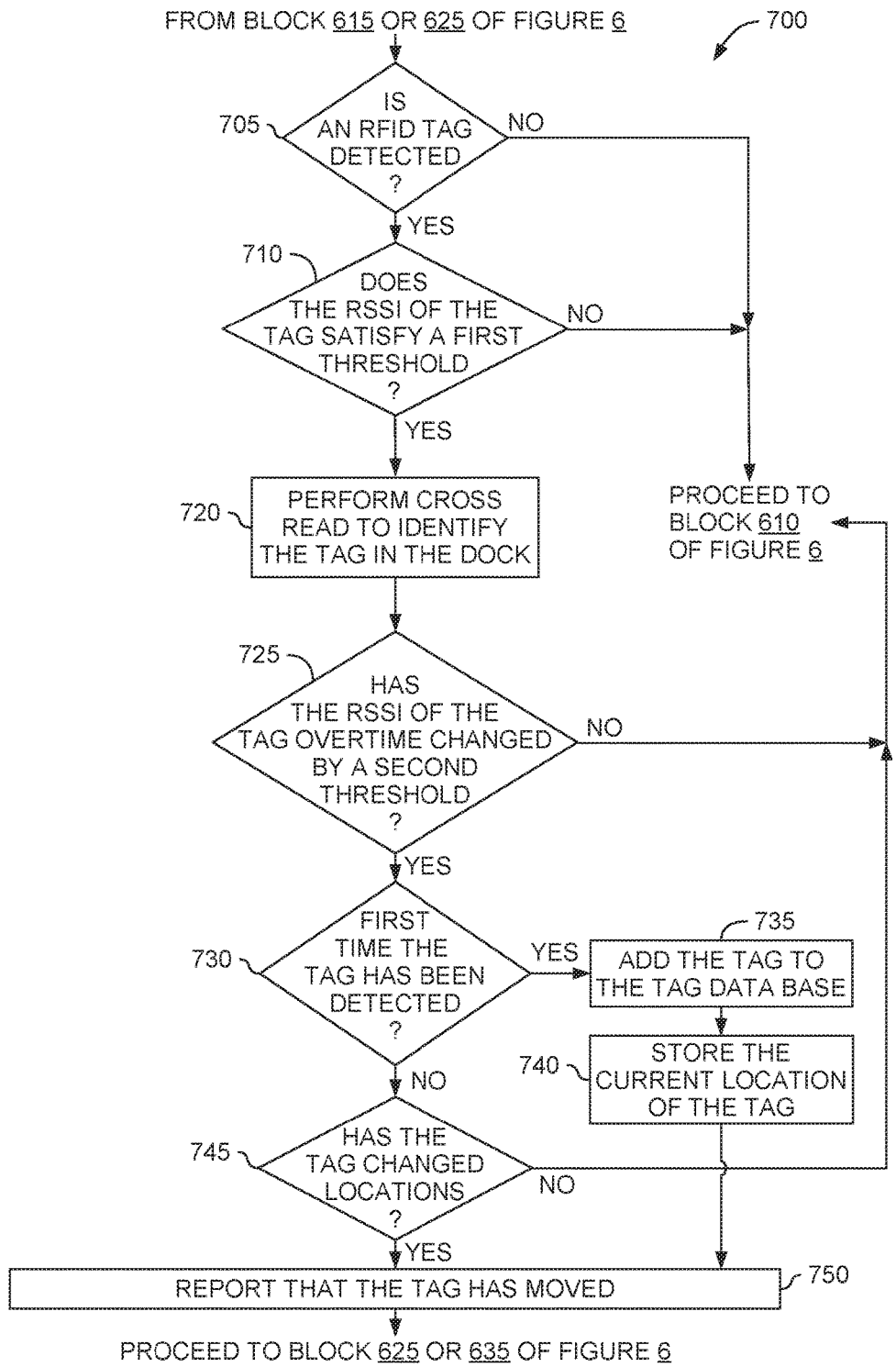
FIG. 7 is a flowchart for determining whether an RFID tag has moved in the RFID read or sensing regions, according to various embodiments.

FIG. 7 is a flowchart of a method 700 for determining whether an RFID tag has moved into the RFID read or sensing regions, according to various embodiments. The method 700 can be performed to detect movement in the sensing region or the read region which corresponds to blocks 620 and 630 in the method 600. Put differently, the method 700 describes a technique for determining whether an RFID tag has moved into the sensing and read regions. Thus, the method 700 can begin after blocks 615 or 625 of FIG. 6.

At block 705, the portal controller determines if an RFID tag is detected. Stated differently, the portal controller determines if it has received an RFID response to the RFID signals transmitted in the sensing or read regions using the wide or narrow beam antennas. In one embodiment, the portal controller detects an RFID tag when the controller can successfully decode the modulated signals received from the RFID tag in order to identify the tag ID.

If no tag is detected, the method 700 proceeds to block 610 of FIG. 6. Otherwise, the method 700 proceeds to block 710 where the portal controller determines if the RSSI of the received RFID response satisfies a first threshold. For example, the portal controller may determine if the RSSI of the received signal is above a noise floor represented by the first threshold. In one embodiment, the first threshold may be set so that RFID tags located outside the loading dock are not identified as being within the loading dock. For example, multiple RFID tags may be placed at the staging area in preparation of being loaded onto the truck. Because the sensing region may extend into a portion of the staging area, these RFID tags may transmit RFID response which are detected by the portal. However, by setting a sufficiently high threshold, the portal controller can ignore these responses since the signals are too weak to come from an RFID tag moving in the sensing region.

If the RSSI does not satisfy the first threshold, the method 700 proceeds to block 610 of FIG. 6. Otherwise, the method 700 proceeds to block 720 where the portal controller performs a cross read to identify the tag in the dock. In this embodiment, it is assumed that one pallet (and one RFID tag) is loaded into the truck at a time. Thus, in this example, there should not be multiple RFID tags moving in the sensing or read regions. If only one RFID tag is detected, the method 700 can proceed to block 725 without performing further analysis. However, because there can be multiple loading docks adjacent to each other in a warehouse, the portal may detect tags that are moving in an adjacent dock (e.g., the sensing or read regions may extend into neighboring loading docks). To the perspective of the portal controller, it can appear as if multiple RFID tags are moving towards the same dock door.

The cross read enables the portal controller to determine which one of the tags identified at block 710 is in the loading dock. For example, the portal controller may compare results by portal controllers in neighboring loading docks to determine which of the RFID tags they detect. For example, if a portal in a neighboring loading dock has detected only one of the two RFID tags detected at the current loading dock, the portal controller can determine that the RFID tag detected by both of the portals is in the neighboring loading dock while the other RFID tag is in its loading dock.

At block 725, the portal controller determines if the RSSI of the tag has changed over time by a second threshold. Here, the portal controller monitors the RSSI over a period of time to track the RSSI of the signals received from the RFID tag. As mentioned above, changes in the environment surrounding the RFID tag can cause the signal strength to decrease and increase although the RFID tag remains stationary. The RSSI of the signals emitted by the tag may spike or drop suddenly between two samples even though the RFID tag has not moved. By evaluating these changes over time (e.g., taking the average of thousands or millions of samples obtained over a 1-5 second period), the portal controller can determine whether the change in the average RSSI has satisfied the second threshold. Stated differently, the portal controller determines whether the change in RSSI over a predetermined time period is sufficient to indicate the RFID tag is moving.

If the change in RSSI does not satisfy the second threshold, the method 700 proceeds to block 610 of FIG. 6. Otherwise, the method 700 proceeds to block 730 where the portal controller determines if this is the first time the tag has been detected. In one embodiment, block 730 is used when the sensing region is active but may be omitted if the read region is active. That is, because the tag first passes through the sensing region before the read region, an unknown tag should first be detected when the sensing region is active. However, also performing block 730 when the read region is active can be used as a check to ensure that method 600 was performed properly—i.e., the same RFID tag that was detected in the sensing region is then detected in the read region.

If it is the first time the tag tracker or inventory tracking system has detected the tag, the method 700 proceeds to block 735 where the tag tracker adds the tag to the tag database. When doing so, at block 730, the tag tracker stores the current location of the tag in the tag database (e.g., the sensing or read region of a particular loading dock). Thus, in addition to storing a loading dock assignment for the tag, at block 740, the tag database can store the last known location of the tag. Moreover, the tag database can store other parameters corresponding to the RFID tag such as a transition coefficient, average RSSI, and peak RSSI. For example, the peak RSSI may be compared at block 725 to future RSSI measurements to determine whether the RFID tag has transitioned or moved to a different region in the warehouse.

In one embodiment, the tag database may store tags only for a fixed time period (e.g., 24 hours). Thus, if a tag is not detected within that time frame, it is removed from the tag database and is again added to the database once the tag is detected by an RFID system. In one embodiment, the tag database may store information about tags in a single warehouse. However, in another embodiment, the tag database can store current location information for tags at multiple warehouses and distribution centers. In this example, the tag database is a central repository which tracks tags as the associated inventory moves into different locations and buildings of a distribution network. For example, after the tagged inventory is shipped, the tag database can be updated after the inventory is unloaded at a different regional warehouse and passes through a portal.

If the inventory tracking system indicates the tag has been detected previously at block 730, the method 700 proceeds to block 745 where the tag tracker determines whether the tag has changed locations. In one embodiment, the tag tracker compares the location of the tag stored in the tag database with the current location being reported by the portal. For example, if the tag database indicates the RFID tag was previously detected at Loading Dock A but is now detected in the sensing region at Loading Dock B, the tag tracker knows the tag has moved. In another embodiment, the tag tracker may track a location of the tags that are in the same loading dock. For example, if the tag database indicates the tag was most recently in the sensing region of Loading Dock A, but now the portal indicates the tag is in the read region of Loading Dock A, the tag tracker may determine the tag has moved.

If the tag has moved, the method 700 proceeds to block 750; otherwise, the method 700 returns to block 610 of FIG. 6. At block 750, the tag tracker reports that the tag has moved to a different location from what was stored in the tag database. In one embodiment, the tag tracker updates the tag database to reflect the current location of the RFID tag.

If the method 700 is performed to detect movement in the sensing region, the method 700 proceeds to block 625 where the read region is activated. If the method 700 is performed to detect movement in the read region, the method 700 proceeds to block 635 where the portal controller reports that the RFID tagged inventory is being loaded into the truck.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used to implement embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A radio frequency identification (RFID) system, comprising:
    an inventory tracking system storing a first assignment between a portal and RFID tags, wherein the inventory tracking system comprises a tag database, wherein each entry in the tag database indicates an RFID tag ID, a previous location of an RFID tag, and a second assignment of the RFID tag to at least one door in a building; and
    at least two portals disposed opposite one another to form a passageway therebetween, wherein at least one of the portals comprises:
        a wide beam antenna configured to emit RFID signals to establish a sensing region;
        a narrow beam antenna configured to emit RFID signals to establish a read region;
        an RFID reader; and
        a portal controller configured to:
            activate the sensing region;
            upon detecting the RFID tag in the sensing region using the RFID reader, activate the read region;
            upon detecting the RFID tag in the read region using the RFID reader, report to the inventory tracking system that the RFID tag is passing through the passageway; and
            provide at least one of audio and visual feedback after receiving confirmation from the inventory tracking system that the RFID tag is assigned to the portal.

2. The RFID system of claim 1, wherein detecting that the RFID tag is in the sensing region comprises:
    comparing a current location received from the portal controller to the previous location of the RFID tag stored in the tag database; and
    determining that the RFID tag is in the sensing region when the current location is different from the previous location.

3. The RFID system of claim 1, wherein detecting that the RFID tag is in the sensing region comprises:
    receiving multiple RFID responses from the RFID tag over a time period; and
    determining whether a change in a received signal strength indicator (RSSI) value corresponding to the multiple RFID responses has satisfied a threshold indicating the RFID tag has moved.

4. The RFID system of claim 1, wherein the RFID tag is a passive tag, wherein the RFID tag comprises a modulator configured to use the RFID signals received from the portals to transmit a modulated RFID response comprising the RFID tag ID of the RFID tag.

5. A portal, comprising:
    a first antenna;
    a second antenna, wherein a beam width of the first antenna is wider than a beam width of the second antenna;
    an RFID reader;
    a visual indicator; and
    a portal controller configured to:
        activate a sensing region by emitting RFID signals from the first antenna, wherein the sensing region is activated in response to receiving a signal from a sensor indicating that a door at which the portal is located is open;
        upon detecting an RFID tag is in the sensing region using the RFID reader, activate a read region by emitting RFID signals from the second antenna;
        determine whether the RFID tag is in the read region based on receiving RFID signals from the RFID tag; and
        operate the visual indicator to output feedback based on determining whether the RFID tag is assigned to the door.

6. The portal of claim 5, wherein the first antenna is arranged in the portal to have a first angle of offset relative to a reference axis and the second antenna is arranged in the portal to have a second angle of offset relative to the reference axis, wherein the first angle of offset is greater than the second angle of offset.

7. The portal of claim 5, wherein the visual indicator is configured to output a first color light when the RFID tag is assigned to the door and a second, different color of light when the RFID tag is not assigned to the door.

8. The portal of claim 5, further comprising:
    a third antenna with a same beam width as the first antenna; and
    a fourth antenna with a same beam width as the second antenna,
    wherein the first and third antennas are configured to emit RFID signals in parallel to establish the sensing region and the second and fourth antennas are configured to emit RFID signals in parallel to establish the read region, wherein the sensing region is larger than the read region.

9. The portal of claim 5, wherein detecting the RFID tag is in the sensing region comprises:
   determining that a current location of the RFID tag is different from a previously stored location of the RFID tag.

10. The portal of claim 5, detecting the RFID tag is in the sensing region comprises:
    determining whether a change in a RSSI value corresponding to signals received from the RFID tag over a predefined time period satisfy a threshold.

11. A method, comprising:
    activating a sensing region in response to determining that a door at which a portal is located is open by emitting RFID signals from a first antenna disposed in the portal;
    upon detecting an RFID tag is moving in the sensing region, activating a read region by emitting RFID signals from a second antenna disposed in the portal, wherein a beam width of the first antenna is wider than a beam width of the second antenna;
    determining whether the RFID tag is in the read region based on receiving RFID signals from the RFID tag; and
    outputting a visual indicator based on determining whether the RFID tag is assigned to the door.

12. The method of claim 11, wherein the first antenna is arranged in the portal to have a first angle of offset relative to a reference axis and the second antenna is arranged in the portal to have a second angle of offset relative to the reference axis, wherein the first angle of offset is greater than the second angle of offset.

13. The method of claim 11, wherein outputting the visual indicator comprises:
    outputting a first color light when the RFID tag is assigned to the door; and
    outputting a second, different color of light when a different RFID tag detected by the portal is not assigned to the door.

14. The method of claim 11, wherein detecting the RFID tag is moving in the sensing region comprises:
    determining that a current location of the RFID tag is different from a previously stored location of the RFID tag.

15. The method of claim 11, wherein detecting the RFID tag is in the sensing region comprises:
    determining whether a change in a RSSI value corresponding to signals received from the RFID tag over a predefined time period satisfy a threshold.

* * * * *